(12) United States Patent
Hand

(10) Patent No.: US 6,514,039 B1
(45) Date of Patent: Feb. 4, 2003

(54) PROCESSING TIP TREATMENT BARS IN A GAS TURBINE ENGINE

(75) Inventor: Derek George Hand, Keynsham (GB)

(73) Assignee: Rolls-Royce PLC, London (GB)

( * ) Notice: Subject to any disclaimer, the term of this patent is extended or adjusted under 35 U.S.C. 154(b) by 238 days.

(21) Appl. No.: 09/711,101

(22) Filed: Nov. 14, 2000

(30) Foreign Application Priority Data

Nov. 25, 1999 (GB) .............................................. 9927917

(51) Int. Cl.[7] .............................................. F01D 25/24
(52) U.S. Cl. .................... 415/119; 415/57.4; 415/58.5; 415/200; 415/914; 29/889.21; 29/889.22; 72/53
(58) Field of Search .............................. 415/119, 173.1, 415/173.5, 186, 914, 208.2, 208.3, 208.5, 211.1, 57.1, 57.4, 58.5, 58.7, 200; 29/889.21, 889.22; 72/53, 54, 56

(56) References Cited

U.S. PATENT DOCUMENTS

| | | | | |
|---|---|---|---|---|
| 4,428,213 A | * | 1/1984 | Neal et al. ...................... | 72/53 |
| 5,569,018 A | * | 10/1996 | Mannava et al. ............ | 415/200 |
| 5,762,470 A | * | 6/1998 | Gelmedov et al. .......... | 415/57.4 |
| 6,409,470 B2 | * | 6/2002 | Allford et al. .............. | 415/119 |

FOREIGN PATENT DOCUMENTS

WO            WO 94/20759              9/1994

* cited by examiner

Primary Examiner—Christopher Verdier
(74) Attorney, Agent, or Firm—Oliff & Berridge, PLC

(57) ABSTRACT

Tip treatment bars 16 of a rotor casing 2 for a gas turbine engine are subjected to a process which induces compressive stress within the bars 16. The process may be a laser shock peening process applied to opposite sides 20 of each bar 16. The processing of the tip treatment bars 16 renders them less susceptible to fatigue failure.

16 Claims, 2 Drawing Sheets

PROCESSING TIP TREATMENT BARS IN A GAS TURBINE ENGINE

FIELD OF THE INVENTION

This invention relates to the processing of tip treatment bars of a rotor casing for a gas turbine engine.

BACKGROUND OF THE INVENTION AND PRIOR ART

WO94/20759 discloses an anti-stall tip treatment means in a gas turbine engine, in which an annular cavity is provided adjacent the blade tips of a compressor rotor. The cavity communicates with the gas flow path through the compressor past a series of bars extending across the mouth of the cavity.

Such tip treatments are applicable to both fans and compressors of gas turbine engines, and their purpose is to improve the blade stall characteristics or surge characteristics of the compressor.

The passage of the blade tips past the bars creates vibrations in the bars which, over time, can result in fatigue failure of the bars.

It is an object of the present invention to increase the fatigue life of the bars.

It is a further object of the present invention to avoid premature failure of the bars, and consequent damage to the engine.

SUMMARY OF THE INVENTION

According to one aspect of the present invention, there is provided a method of processing tip treatment bars of a rotor casing for a gas turbine engine, the method comprising subjecting the bars to a process which induces compressive stress within the bars.

According to another aspect of the present invention there is provided a gas turbine engine having a bladed rotor which is rotatable within a casing, the casing being provided with an array of spaced tip treatment bars disposed adjacent the blade tips of the rotor, in which the bars have been subjected to a process which induces compressive stress within the bars.

The process applied to the bars is preferably a surface process, and may be a peening process. A shot peening process may be used, but in a preferred application of the invention, a laser shock peening process is used.

The process is preferably applied to at least one side of each bar (i.e. a face having a radial component of direction with respect to the engine axis). Preferably, both sides of the bar are subjected to the process.

DETAILED DESCRIPTION OF A PREFERRED EMBODIMENT

Figure 1:
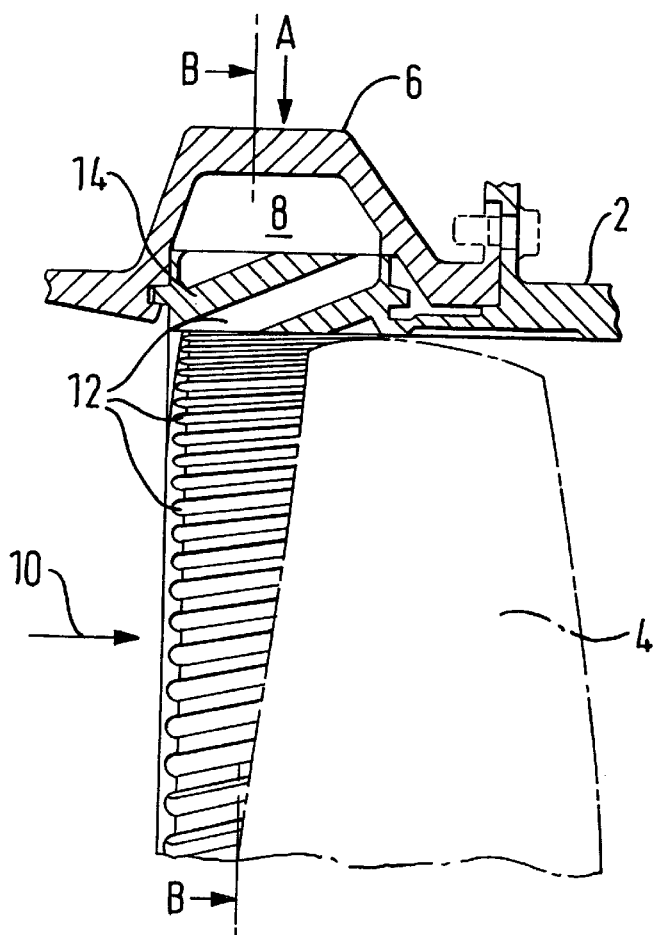
FIG. 1 is a partial axial sectional view of a fan stage in a gas turbine engine.

FIG. 1 represents a fan casing 2 of a gas turbine engine. A fan, represented by a single blade 4, is mounted for rotation in the casing 2. The casing 2 includes a circumferentially extending channel 6, which defines a chamber 8. The chamber 8 communicates with the main gas flow through the fan (represented by an arrow 10) through an array of slots 12 which extends around the casing. The function of the chamber 8 in delaying the onset of stalling of the blades 4 is disclosed in International Patent Publication WO94/20759, to which reference is directed.

Figure 2:
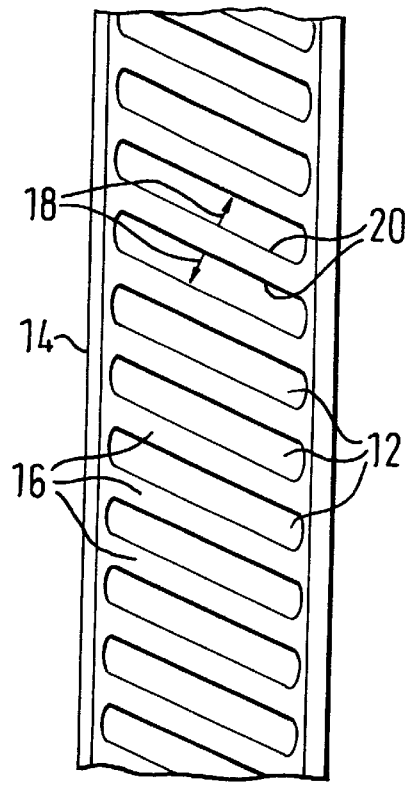
FIG. 2 is a view of a component of the fan stage taken in the direction of the arrow A in FIG. 1.
Figure 3:
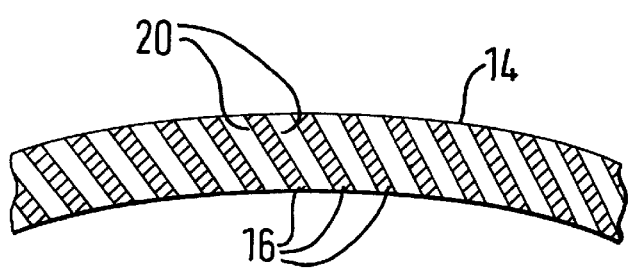
FIG. 3 is a sectional view taken on the line B—B in FIG. 1.

The slots 12 are formed in a tip treatment ring 14 which is fitted within the casing 2 and extends around the fan 4. The slots 12 are inclined in both the axial direction (as shown in FIG. 2) and the radial direction (as shown in FIG. 3). The slots 12 are separated from one another by tip treatment bars 16. The ring 14, including the bars 16, is made from an appropriate alloy.

The bars 16 vibrate in operation of the engine at a frequency determined by the passage of the blades 4. This vibration can lead to fatigue failure of the bars 16. The vibrating bars 16 deflect in a generally circumferential direction as indicated diagrammatically in FIG. 2 by arrows 18, and consequently fatigue failure tends to be initiated by cracking in the side surfaces 20 of the bars 16, that is, the sides of the bars 16 which extend in a direction having a radial component.

In order to provide the bars with resistance to fatigue cracking, they are subjected, during manufacture of the ring 14, to a process which induces compressive stress in the side surfaces 20 of each bar. A laser shock peening process may be used for this process.

Figure 4:
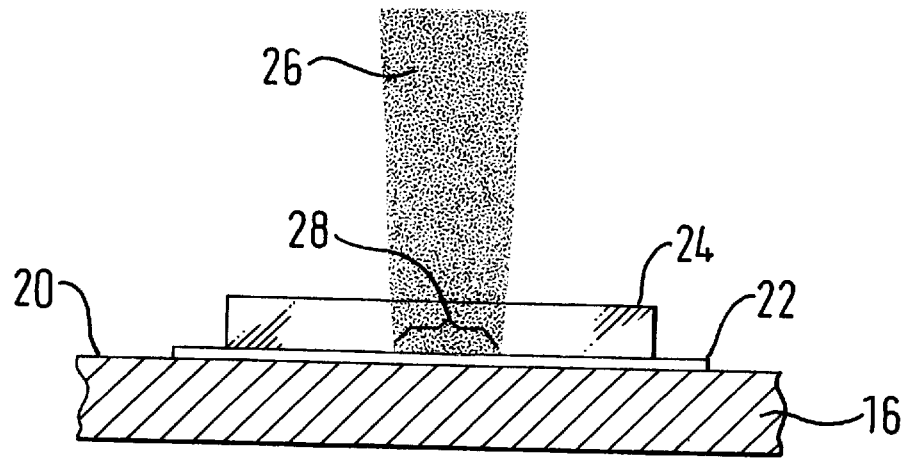
FIG. 4 represents diagrammatically a laser shock peening process.
Figure 5:
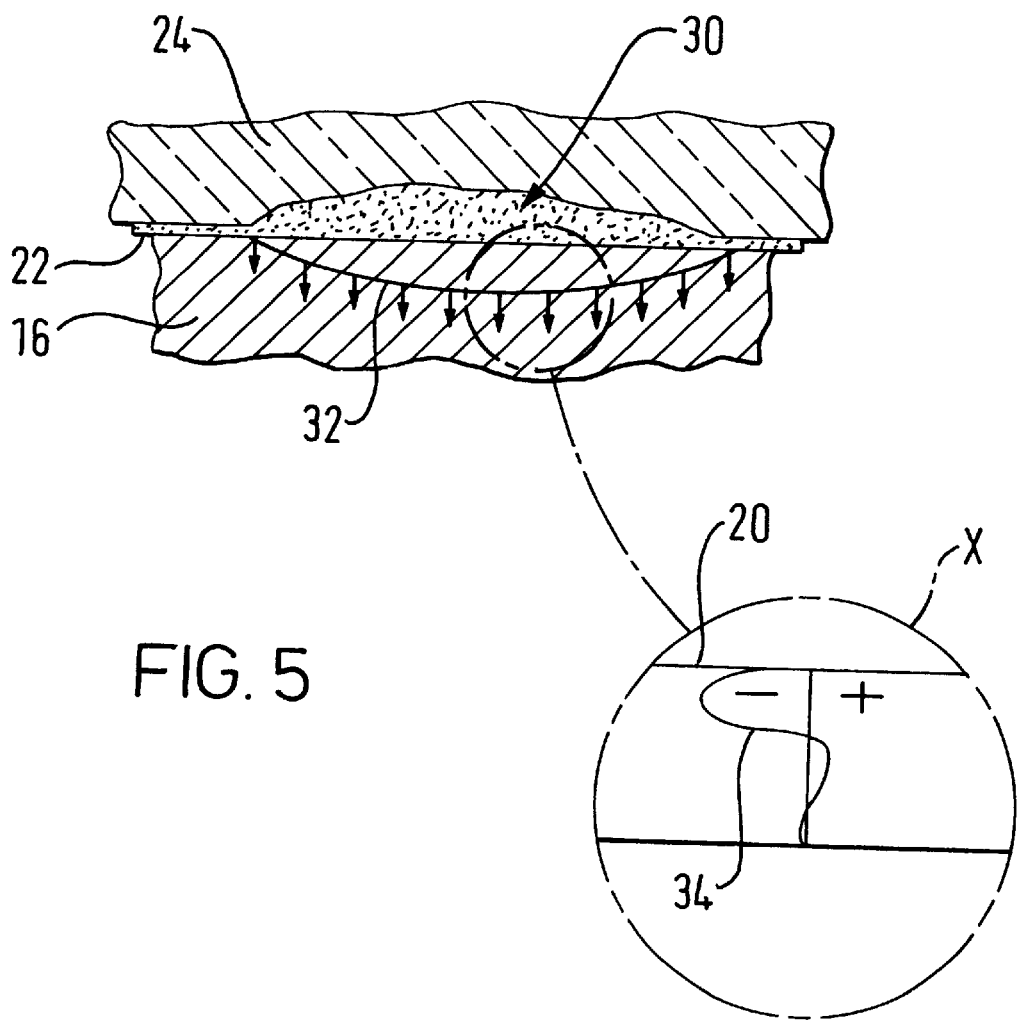
FIG. 5 is an enlarged view representing the laser shock peening process.

A laser shock peening process is represented diagrammatically in FIGS. 4 and 5. As shown in FIG. 4, an opaque layer 22, such as black paint, is applied to the surface 20. A transparent layer 24, which may be water, is applied over the opaque layer 22.

A pulsed laser beam 26 is directed at the bar 16 through the transparent layer 24. When the beam 26 strikes the opaque layer 22, in region 28, the laser energy vaporises the opaque layer 22 causing an explosive impact to be applied to the surface 20 of the bar 16. The transparent layer 24 provides a reaction element, increasing the force of the explosive impact on the surface 20.

As shown in FIG. 5, the impact applied by the vaporised part 30 of the opaque layer 22 causes a shock wave 32 to propagate into the bar 16. As shown in the enlarged view represented in the circle X, the shock wave 32 causes plastic deformation of the material of the bar 16 in its surface region, resulting in an induced compressive stress adjacent the surface 20. This is represented by the curve 34 in the enlarged view X, where the negative sign represents compressive stress while the positive side represents tensile stress.

It will be appreciated that the laser shock peening processing of the bars 16 need not be applied over the entire area of the surfaces 20. Instead, the processing can be confined to those regions at which fatigue cracking is most likely to be initiated. Also, it will be appreciated that other methods of inducing compressive stress, such as shot peening, may be used. Furthermore, a combination of processes may be used, with shot peening being applied through some regions of the surface 20 and laser shock peening being applied at other regions.

Although the invention has been described with reference to a fan casing, it may be applied also to tip treatment bars in a compressor casing.

I claim:

1. A method of processing tip treatment bars of a rotor casing for a gas turbine engine, the method comprising subjecting the bars to a process which induces compressive stress within the bars.

2. A method as claimed in claim 1, in which the process is a surface treatment process.

3. A method as claimed in claim 2, in which the process is a peening process.

4. A method as claimed in claim 3, in which the process is a shot peening process.

5. A method as claimed in claim 3, in which the process is a laser shock peening process.

6. A method as claimed in claim 1, in which the process is applied to a surface of each bar which extends in a direction having a radial component.

7. A method as claimed in claim 6, in which the process is applied to opposite sides of the respective bar.

8. A method of processing tip treatment bars of a rotor casing for a gas turbine engine, each bar having opposite sides defining radially extending surfaces, the method comprising subjecting the radially extending surfaces to a laser shock peening process which induces compressive stress within the bars.

9. A gas turbine engine comprising:

a casing;

a rotor which is rotatable within the casing, the rotor comprising blades having blade tips;

an array of spaced tip treatment bars provided in the casing and disposed adjacent the blade tips of the rotor;

wherein the bars have been subjected to a process which induces compressive stress within the bars.

10. A gas turbine engine as claimed in claim 9, in which the bars have been subjected to a surface treatment process.

11. A gas turbine engine as claimed in claim 10, in which the bars have been subjected to a peening process.

12. A gas turbine engine as claimed in claim 11, in which the bars have been subjected to a shot peening process.

13. A gas turbine engine as claimed in claim 10, in which the bars have been subjected to a laser shock peening process.

14. A gas turbine engine as claimed in claim 9, in which the bars have been subjected to a process which is applied to a surface of each bar which extends in a direction having a radial component.

15. A gas turbine engine as claimed in claim 14, in which the bars have been subjected to the process which is applied to opposite sides of the respective bar.

16. A gas turbine engine comprising:

a casing;

a rotor which is rotatable within the casing, the rotor comprising blades having blade tips;

an array of tip treatment bars provided in the casing and disposed adjacent the blade tips of the rotor, the bars having opposite sides defining radially extending surfaces of the bars; wherein the radially extending surfaces of the bars have been subjected to a laser shock peening process which induces compressive stresses within the bars.

* * * * *